United States Patent [19]

Haines

[11] Patent Number: 4,492,391

[45] Date of Patent: Jan. 8, 1985

[54] THRUST ROD ANCHOR FOR PIPE JOINT RESTRAINT SYSTEMS

[75] Inventor: Robert E. Haines, Columbus, Ohio

[73] Assignee: Star Industries, Inc., Columbus, Ohio

[21] Appl. No.: 374,000

[22] Filed: May 3, 1982

[51] Int. Cl.³ .............................................. F16L 13/04
[52] U.S. Cl. .................................... 285/114; 285/368; 285/374; 285/400; 285/404; 285/413
[58] Field of Search .............. 285/114, 368, 374, 412, 285/413, 400, 404; 24/270, 279; 29/237

[56] References Cited

U.S. PATENT DOCUMENTS

| 769,131 | 8/1904 | Dillenburg | 285/368 X |
| 940,098 | 11/1909 | Wehrle | 285/368 X |
| 3,144,261 | 8/1964 | Stephens | 285/114 |
| 3,252,192 | 5/1966 | Smith | 285/114 X |
| 3,333,872 | 8/1967 | Crawford et al. | 285/374 |
| 3,729,797 | 5/1973 | Ambrose | 285/21 X |
| 3,819,210 | 6/1974 | Daniel et al. | 285/223 X |
| 3,836,182 | 9/1974 | Miller | 285/114 |

FOREIGN PATENT DOCUMENTS 236716  11/1964  Austria .............................. 285/114

OTHER PUBLICATIONS

The Standard Mechanical Joint Retainer Gland Brochure of Standard Fire Protection Equipment Co., Charlotte, N.C.
*Technology in American Water Development*, Johns Hopkins Press, Balt. Md., pp. 5–10.
*Water Supply Engineering*, McGraw-Hill Book Co., Inc., N.Y., pp. 222–223; 145–149; 340–341.
*Elements of Water Supply Engineering*, John Wiley and Sons Inc., N.Y., pp. 168–175.
*Pipeline Design for Water Engineers*, 1981, Elsevier Scientific Publishing Co., N.Y., pp. 53–56; 171–175.

Primary Examiner—Dave W. Arola
Attorney, Agent, or Firm—Mueller and Smith

[57] ABSTRACT

A thrust rod anchor for utilization in conjunction with a tied form of pipe joint restrainer system. The anchor utilizes spacers which are supported by flanges at their outer extremities and are bolted together over a pipe. A pipe engaging support is provided in conjunction with the outwardly disposed portions of the spacers in a manner wherein a rigid structural support is located adjacent to the surface of the pipe which serves to support and carry symmetrically disposed pipe engaging set screws. Thrust rods are connected to the assembly intermediate outwardly disposed connecting bolts and the set screws. The anchor assemblies of the invention have been shown to provide substantially enhanced anchoring resistance to thrust forces.

20 Claims, 12 Drawing Figures

THRUST ROD ANCHOR FOR PIPE JOINT RESTRAINT SYSTEMS

BACKGROUND

A mastery of water-use techniques by civilization has been evidenced for thousands of years, one high point being reached with the development by the Romans of long-distance water transportation. Within the current century, the introduction of practical turbine pumps, large scale water storage and practical water transmission networks has greatly expanded public water supply systems. See in this regard:

I. "Technology in American Water Development" by Ackerman and Lof, the Johns Hopkins Press, Baltimore, Md.

Concomitant with the expansion of water transmission networks has been the development of improved piping techniques. For example, the DeLavaud process permitted a practical and improved centrifugal casting of pipe used in water supply networks, while in about 1948 further improvements in pipe construction were evidenced by the development of ductile iron pipe having important strength and corrosion resistance properties. To provide for practical assembly of pipeline matrix components, a variety of joining devices and techniques have been developed. The more popular of these approaches to joining pipe is referred to as a "bell-and-spigot" joint or push joint which is made by slipping a male or spigot end of one pipe section into the bell end of an adjacent pipe essentially until contact is made at the base of the bell. A flexible gasket positioned within the joint assures its water-tight integrity. As may be apparent, this construction is popular both due to the lowering of labor requirements for assembly and due to the simplicity and lower cost of pipes intended for such joining provisions.

A related joining approach utilized principally in the assembly of tees, elbows and plugs provides a mechanical joint wherein a flange is fabricated on one end of a such a component or pipe length and a ring-shaped gland is positioned over the adjacent pipe end. By bolting the flange and gland together such that a flexible seal at the joint is compressed, a water-tight union is achieved. The pull-apart resistance or strength of such joint has been enhanced through the use of set screws in conjunction with the bolted gland, however, resort to such a joining technique in typically encountered lengthy runs of piping is both impractical and unduly expensive.

The design of a municipal piping matrix necessarily involves very long pipelines evidencing numerous directional changes and the resultant use of elbows and attendant joints as well as tee components leading to fire hydrants or user entities. Thus, not only are bursting pressure stresses, pipe weight considerations, superimposed loads as are associated with back fill, water hammer stresses and the like contemplated by the designer, but also the longitudinal forces which become active whenever there is any change in the horizontal or vertical alignment of a length of pipeline must be accommodated for. In this regard, see the following publication:

II. "Pipeline Design for Water Engineers" by Stephenson, Elsevier Scientific Publishing Company, New York, 1981.

Without an appropriate accommodation, these longitudinal forces will cause pipe joints to separate. Accordingly, early pipeline design approaches resorted to the use of concrete thrust blocks at each pipeline bend which were structured to counteract: (a) the dynamic thrust due to change in direction of water flow, and (b) the thrust in the direction of each leg of a bend due to water pressure in the pipe.

One successful approach to assuring joint integrity against the above-described thrust forces has been through resort to tying techniques wherein spaced but adjacent flanged joint components are tied together by elongate thrust rods. To simplify the tying procedure, such innovations as "Tiebolts" have evolved to simplify thrust rod placement. See in this regard U.S. Pat. No. 3,144,261. A condition often occurs wherein the thrust rods used in tying a directional changing joint to an elongate run of pipe presents a condition wherein an anchoring flange is not available to provide a rearwardly disposed thrust rod connection. Under these conditions, a conventional retainer clamp has been affixed to a length of such rearwardly disposed bell-and-spigot jointed pipe. The clamps have been of purely conventional design, two clamp components being bolted over the outer circumference of the pipe and retained in place on the pipe by clamping pressure. Thrust rods then were attached to the clamp outwardly of the bolts holding the clamp to the pipe and extended along and parallel to the pipe for attachment to the flanged component. In order to obtain sufficient anchorage, the assembly team must position the retainer clamp a sufficient distance rearwardly along the length of pipe to provide for the resistances achieved by the mass of pipe itself, friction with the trench, associated back fill and the like. As a consequence, thrust rods of lengths approaching 200 feet have not been an unusual encounter.

Over the recent past, traditional retainer clamps have been tested for their capability of anchoring thrust rods against typically encountered joint restraint loads. Depending upon the water pressure, pipe diameters and the like, such loads will vary from about 10,000 pounds total thrust to about 40,000 pounds of thrust. Where conventional clamps have been tested as they are affixed to straight or unaltered lengths of conventional ductile iron pipe, the clamps will commence to slip at about 5,000 to 8,000 pounds of thrust or pull. Considering that a failure for a joint is one wherein movement between the male and female components takes place, any significant clamp slippage under these thrust loads will result in an unacceptable tying procedure. Usually, a slippage in excess of about 0.74 inches is considered to constitute a joint failure, it being understood, that in the assembly of the components, variations in the degree of seating between mated components will occur.

Generally, in order to achieve a satisfactory and fully reliable tying system wherein clamping techniques must be used, a thrust load resisting capability of 44,000 pounds should be achievable in order to provide adequate factors of safety. This thrust load anchoring capability must be achievable under clamping conditions wherein no buttressing otherwise available from the bell-and-spigot configuration itself is at hand, i.e. the clamping technique must be usable on straight sections of pipe. To the time of the instant invention, such capability for providing adequate tired joint restraint overcoming thrust loads has not been available.

SUMMARY

The present invention is addressed to pipe joint restrainer systems utilizing tying techniques wherein the retainer clamps of the prior art are replaced with anchoring devices having a capability for providing restraint against very high thrust loads. This improved joint restraint is achieved through the utilization of a thrust rod anchor which incorporates spacers to position and retain oppositely disposed pipe engaging supports in position against a pipe surface. These supports carry retainers in the form of set screws which are tightened by the installer into engagement with the pipe surface. Thrust rods then are abuttably connected to the assembly at an advantageous, inward position, and may be used to restrain very high thrust loads, for example of values of 44,000 pounds and higher.

Another object and feature of the invention is to provide an improved thrust rod anchor for use in a pipe joint restrainer system wherein elongate thrust rods are connected in tension between one side of a joint and a portion of remotely disposed pipe. The pipe will have a given axis. The thrust rod anchor includes at least two spacers of given widthwise extent defined between oppositely disposed edges thereof. Each of the spacers is positionable over a portion of the outer surface profile of the pipe within the tying system and the spacers are extensible outwardly from the surface of the pipe in mutually spaced adjacency to define oppositely disposed thrust rod support regions. Flanges are fixed in structural supporting relationship with the opposite parallel edges of the spacers within the noted thrust rod regions. A connector arrangement is provided for connecting together the spacers within the thrust rod regions and these connectors are spaced outwardly from the position of the surface of the pipe which is adjacent thereto. Two pipe engaging supports, each including a rigid structural support, are provided within each thrust rod support region of the anchor assembly. One each of these engaging supports is operationally positioned adjacent a pipe surface within a thrust rod support region. The structural supports are substantially parallel with the pipe axis and are positioned inwardly from the connectors. Further, the pipe engaging supports are arranged such to be configured in mutually supporting relationship with the flanges. Thrust plates are utilized in stress transfer relationship with the pipe engaging supports and each of the thrust plates is provided having an opening located intermediate the connectors and the pipe for receiving and abuttably retaining one end of a thrust rod. A retainer arrangement is provided in the form of set screws which are engageable with the pipe engaging support for penetrably engaging the surface of the pipe and restraining the pipe support arrangement from movement along the axis of the pipe.

Other objects of the invention will, in part, be obvious and will, in part, appear hereinafter.

The invention, accordingly, comprises the apparatus and system possessing the construction, combination of elements, and arrangement of parts which are exemplified in the following detailed disclosure.

For a fuller understanding of the nature and objects of the invention, reference should be had to the following detailed description taken in connection with the accompanying drawings.

DETAILED DESCRIPTION

The longitudinal forces which are developed by fluid flow around bends and which now may be accommodated for by tying systems have long been the subject of evaluation. For example, the longitudinal tension resulting from the flow of water around a 90° bend in a closed conduit flowing full of water may be computed from the expression $$T = \frac{WAV^2}{g} + pA \qquad (I)$$

where
 W = unit weight of water;
 A = cross-sectional area of pipe;
 V = velocity of flow of water;
 g = acceleration due to gravity; and
 p = intensity of internal bursting pressure.

Figure 1:
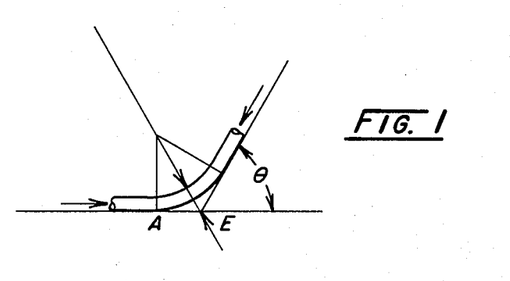
FIG. 1 is a diagramatic representation of a pipe encountering fluid change of direction and employed in analyzing thrust forces generated thereby.

Now, considering the early approach to accommodating for such thrust forces, reference is made to FIG. 1 wherein a closed conduit is represented containing fluid flowing around a bend of an extent represented by angle $\theta$. In early practice, a butress formed of concrete or the like would be designed and positioned for resisting the illustrated resultant force, E. This resultant force may be described as having a magnitude as follows:

$$E = 2A\left(\frac{WV^2}{g} + p\right) \sin\frac{\theta}{2} \qquad (II)$$

In general, it is this form of thrust force for which modern tying systems are designed. For further information concerning the above, reference is made to the following publications:

III. *Water Supply Engineering* by Babbit, Doland, and Cleasby, 6th Ed. McGraw-Hill Book Company, Inc., New York.

IV. *Elements of Water Supply Engineering* by Waterman, 2d Ed. John Wiley & Sons, Inc., New York.

Figure 2:
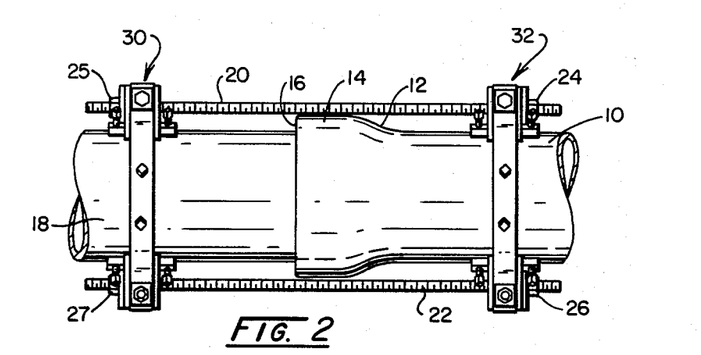
FIG. 2 is a top view of a commonly encountered bell and spigot water pipe connection showing the use of thrust rods and anchor components to establish joint integrity.
Figure 3:
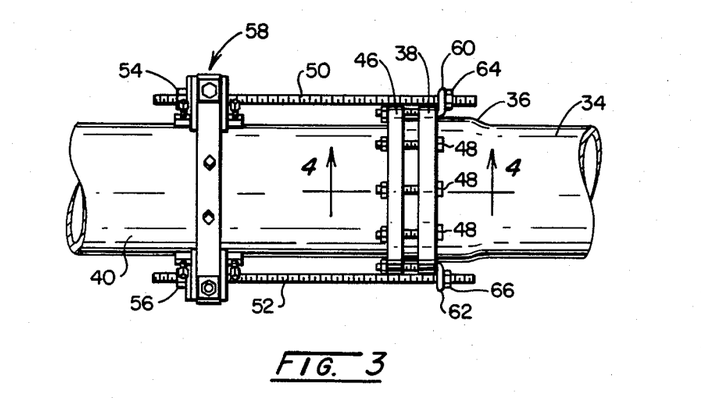
FIG. 3 is a top view of a typically encountered water pipe joint showing the use of tie rods connecting between a flange component and a thrust anchor.
Figure 4:
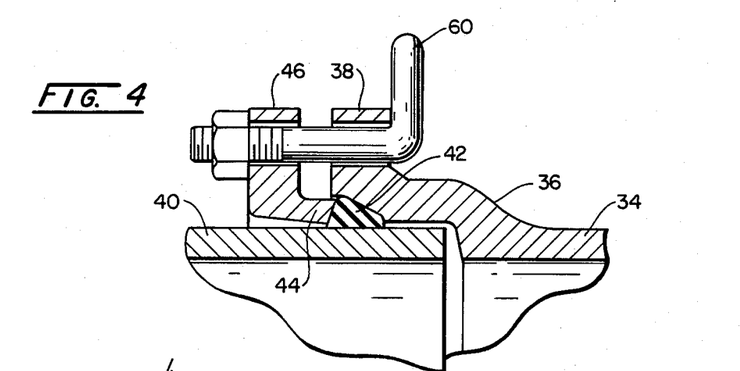
FIG. 4 is a partial sectional view taken through the plane 4—4 of FIG. 3.

Looking now to FIGS. 2–4, pipe joint structures conventionally utilized by the industry are shown in conjunction with joint restrainer tying techniques typically employed but configured in conjunction with the preferred embodiment of a thrust rod anchor according to the invention. FIG. 2 shows a pipe component 10 having an end tapering as at 12 to form a female, bell portion represented generally at 14. Note, that the outermost end of bell portion 14, as at 16, presents a flat surface which resides generally in a plane perpendicular to the central axis of the pipe component 10. A spigot or male end of the next adjoining pipe 18 is inserted as far as possible into bell 14 until substantially nesting against an inwardly disposed flange as shown in FIG. 4. Generally, a flexible gasket is incorporated within bell portion 14 to assure the water tight integrity of the joint. The integrity of the joint further is restrained against thrust induced failure or "blow-out" by two oppositely disposed thrust rods 20 and 22 which are attached by nuts 24–27 to spaced thrust rod anchors represented generally at 30 and 32.

In another arrangement, as illustrated in FIG. 3, a pipe component 34 is provided having a bell shaped portion represented at 36 which is integrally formed with an annular flange 38 having a series of connector openings or apertures regularly spaced around it. For the most part, such components as at 34 are associated with implements having a function changing the direction of fluid flow, such as tees, elbows, and the like wherein dynamic thrust conditions are encountered. Component 34 is shown in connection with a conventional pipe component 40 having a typical "spigot" ending.

Looking again to FIG. 4, the joint structure of FIG. 3 is shown in detail, the end of pipe component 40 being shown having been inserted within bell portion 36 of component 34 essentially to a nesting position against the inwardly disposed flange thereof. A rubber gasket 42 is shown positioned intermediate components 34 and 40 and urged into place by the inwardly protruding portion 44 of a ring shaped or annular gland 46.

Returning to FIG. 3, the gland 46 is shown attached to flange 38 by bolt and nut connectors as at 48. Tying procedures for the joint thus developed may be provided through the use of thrust rods 50 and 52 which extend from connection by respective bolts 54 and 56 abutting against thrust anchor 58 to Tiebolt assemblies 60 and 62 which extend, as shown in FIG. 4, through two of the aligned openings within flange 38 and gland 46. With this arrangement, a bolted connection may be effected for tie rod 50 as at 64 and for tie rod 52 as at 66.

Note that in each of the arrangements shown in FIGS. 2 and 3 that the associated thrust anchors as at 30, 32, or 58 are located upon a portion of pipe which is uninterrupted or "straight", no bearing surface protruding outwardly therefrom to provide an anchoring connection. Such a protruding surface, for example, may be provided by the arrangement including flange 38 shown in FIGS. 3 and 4. Additionally, on occasion, the pipe installer may use the protruding surface of a bell as at 16 to provide a buttress for anchoring purposes. However, in a significant number of installation situations, no such transverse bearing surfaces are available to the installer and resort must be made to some form of restraint associated with an uninterrupted or non-deformed pipe profile.

Figure 5:
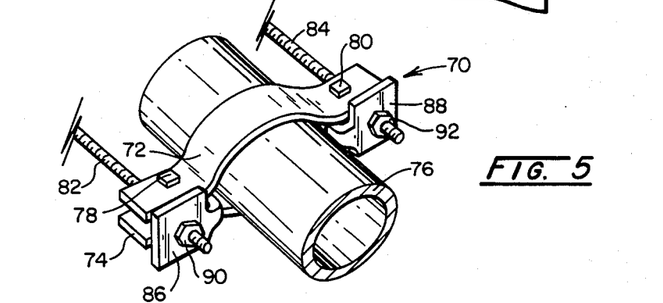
FIG. 5 is a perspective view of a clamp type anchoring device heretofore utilized.

Looking to FIG. 5, a typical retainer clamp which has been utilized by industry for purposes of achieving restraint with respect to straight pipe sections is revealed generally at 70. Clamp 70 is of classic design, being comprised of two clamping segments 72 and 74 which are joined over a pipe section 76 by the pressure asserted from two bolt and nut connectors 78 and 80. Thrust rods as at 82 and 84 are attached to the assembly 70 through respective thrust plates 86 and 88 and are provided abuttable connection by respective nuts 90 and 92. It may be noted, that the configuration requires a "squeezing" or pressure effect to be asserted against the surface of pipe segment 76 by the components 72 and 74 as is developed by heavily torquing the bolt and nut connectors 78 and 80. To facilitate achieving this necessary tight connection, the latter connectors 78 and 80 are located inwardly toward pipe 76 from thrust rods 82 and 84. As is apparent, a moment is asserted upon the assembly 70 from thrust rods 82 and 84 by virtue of this necessary outward mounting thereof.

As indicated earlier herein, the clamps, for example, as described in connection with FIG. 5 should provide a capbility of withstanding thrust forces which will vary from about 10,000 pounds to 40,000 pounds. The applicant has determined that a safe value of total thrust which includes a consideration of factor of safety, for example, in the range of about 2.0, will evolve a thrust resistance requirement or specification to be regularly achieved of 44,000 pounds. Further, the applicant has determined that a slippage in excess of about 0.74 inches may be considered to constitute a joint failure.

With the above performance criteria in mind, tests have been carried out utilizing standard ductile iron pipe suited for water supply systems. These tests all utilize a testing assemblage including a "Southwark" test load applying device operating in conjunction with a Tate-Emery load indicator having a maximum load indicator range of 60,000 pounds. The load applying device was marketed by Baldwin Southwark, Division of Baldwin Locomotive Works, Philadelphia, Pa., while the indicator was manufactured by the A. H. Emery Company, Stamford, Conn.

As an initial test, a conventional clamp as described herein in connection with FIG. 5 was assembled over a length of standard ductile iron water pipe of 6 inch N.D (Nominal Diameter). The ⅝ inch nut and bolt connectors of the clamp were fastened with a torque of 90 foot pounds, following which a preload of approximately 2,000 pounds was applied by the load applying device through thrust rods connected thereto as shown in FIG. 5. A slipping was noticed at between 4,000 and 5,000 pounds. Such yielding and a deformation of the clamp then was observed to an extent wherein the clamp moved downwardly over the rising profile section of a bell portion of the pipe length until loading was discontinued at 24,000 pounds. Another such clamp test utilizing a clamp manufactured by a different manufacturer resulted in similar failure. Generally, such conventional clamps tended to fail by slippage at a total thrust loads of about 5,000 pounds.

Where the conventional clamps described in connection with FIG. 5 where positioned against the transversely disposed shoulders of bell components of pipes as described at 16 in connection with FIG. 2, testing revealed that the clamps were capable of sustaining loads up to about 60,000 pounds total thrust. It should be noted, however, that such a clamping arrangement becomes available to the installer only in connection with about 50 percent of the joint tying situations encountered in practice.

In an effort to derive a configuration of conventional clamps as described in FIG. 5 wherein higher anchoring resistance to thrust loads could be obtained, two such clamps were mounted upon a section of conventional 6 inch N.D. ductile iron pipe in an arrangement where the clamps were off-set angularly with respect to a position transverse to the center line of the pipe an amount of approximately 2½ inches, this angular or askew orientation of the clamp then being thought to perhaps provide an improved "grip" of the pipe to avoid slippage. A thrust rod was connected to one end of each of the thus-attached clamps, the clamp bolt and nut connectors were then tightened under a torque of 90 foot pounds and load was applied by the test equipment described above. At 5,000 pounds total applied thrust load, a deflection of ½ inch was observed and this deflection increased to ⅞ inch at 6,000 pounds. At 7,000 pounds, the deflection increased to 1⅛ inches and the test was concluded at 17,000 pounds total thrust load wherein a deflection of 2¾ inches had been observed. Thus, such an arrangement of conventional clamps was not effective.

In another test arrangement using standard clamps as described in connection with FIG. 5, one clamp was positioned over a second clamp, which in turn, was positioned over a length of 6 inch N.D. ductile iron pipe. These clamps were coupled together with single high strength bolts at each end and thrust rods were attached to the assemblage in conventional fashion (FIG. 5). The connecting bolts were tightened under a torque of 90 foot pounds and load was applied utilizing the test assembly described above. A load of 4,900 pounds was required to produce slippage and this slippage was maintained by a load of 4,300 pounds. Slippage was toward the rising profile of a bell end portion of the pipe length and had reached ¾ inch at a total thrust loading of 10,000 pounds. The test showed that this assemblage of conventional clamps would not produce requisite anchoring capabilities against thrust loads.

As another attempt to improve the thrust anchoring capabilities of the conventional clamps described in connection with FIG. 5, one such clamp was positioned adjacent another and the two clamps were welded together along their widthwise edges to evolve a clamp web or spacer width of about 4 inches. This assemblage was positioned over a section of 6 inch N.D. ductile iron pipe about 1 inch above the commencement of the rising profile portion of the bell end of the pipe length. Two connector bolts, one for each clamp portion were used on each side of the clamp assemblage and thrust bolts were attached thereto in conventional manner. A 90 foot pound torque was applied to each of the four connecting bolts. A pre-load of 2,000 pounds total thrust was applied to the assemblage from the thrust rods and, as this load was gradually increased, the clamp assemblage slipped downwardly over the rising profile of the pipe bell portion. While significantly deformed, the assemblage did hold over the bell section to a load of 60,000 pounds. However, the slippage toward the bell constituted a failure under the criteria set forth above.

In another approach, the conventional clamp structure described in connection with FIG. 5 was combined with an eccentric cam having a construction wherein, as more thrust pressure was applied to the clamp, one each such eccentric cam at each end of the clamp would tend to be further urged into contact with the surface of the pipe being tested. A serrated or toothed surface was provided on each of the eccentric cams. Testing utilizing the apparatus described above, resulted in slippage to failure well below the desired 44,000 pound total thrust values sought. This same design approach was utilized in combination with set screws in an attempt to enhance the gripping capacity of the eccentric cams. This structure also failed to meet the desired thrust load anchoring standard.

In another approach to achieving the desired thrust anchor capabilities for a tying system, an assemblage was formed of two conventional clamp webs and associated clamp bolts. These clamp webs were attached by bolts to an elongate steel plate bored and tapped to receive four set screws of ⅝ inch diameter. Two such plates were manufactured and positioned against a segment of 10 inch N.D. ductile iron pipe. A structure was welded to the two plates to receive the clamp web connecting bolts as well as thrust rods. However, the thrust rods were positioned inwardly of the web bolts. The assemblage was tightened such that a torque of 50 foot pounds was asserted against each of the 8 set screws and a torque of 60 foot pounds was utilized to tighten the clamp webs together against the structure. Four additional set screws were positioned in the clamp webs themselves in tapped bores and tightened to retain the principal set screw retaining plates in position against the test pipe length. The entire arrangement was tested with the test apparatus described above and initial minor deflection was observed at 22,000 pounds total thrust load, deflection being noticed but no slip being observed until about 32,000 total thrust load. Slippage occured at about 33,600 pounds total thrust load, a level representing considerable improvement over earlier attempts but not meeting the criteria set forth above.

Figure 6:
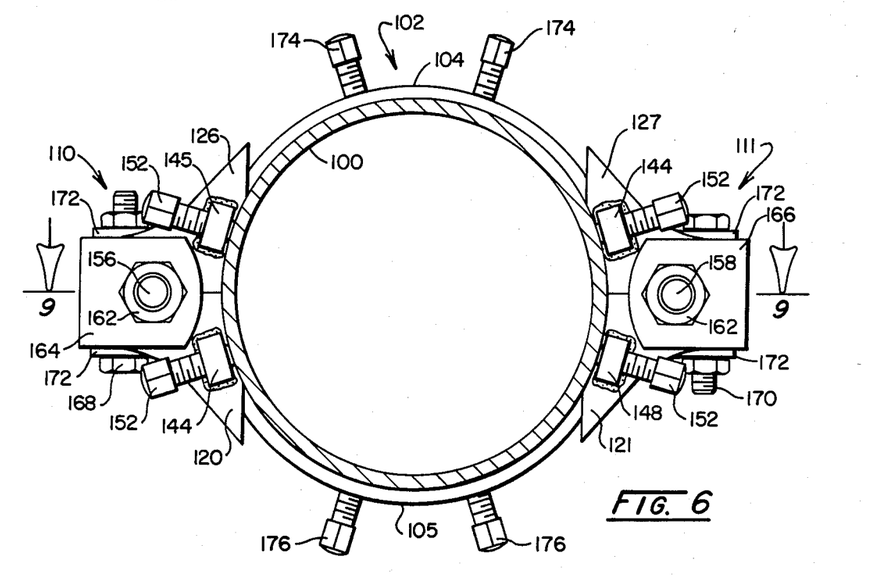
FIG. 6 is an end view of a thrust anchor according to the instant invention as operationally associated with a segment of pipe.
Figure 7:
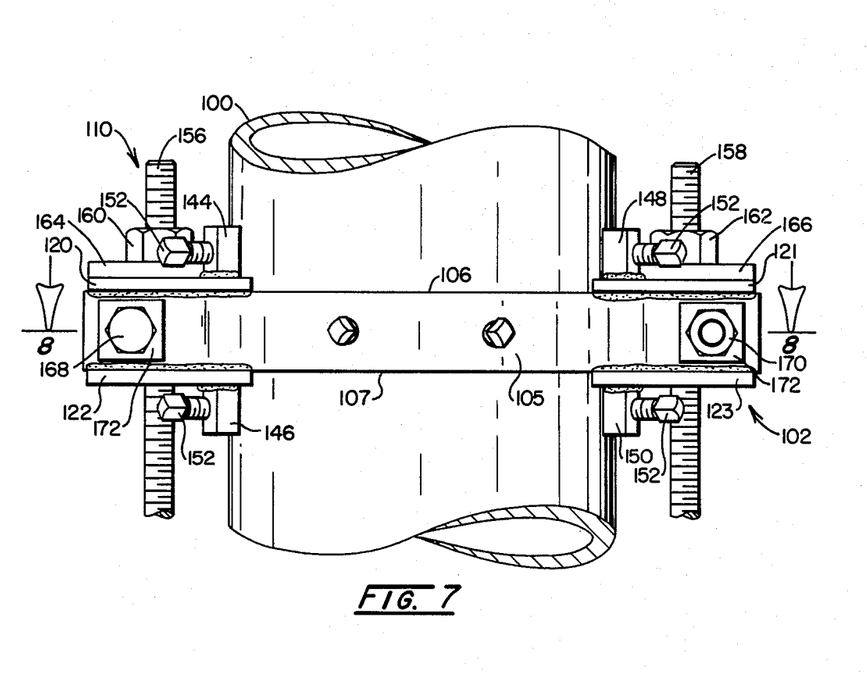
FIG. 7 is a top view of the thrust anchor arrangement depicted in FIG. 6.

Following experimentation and testing as described above, thrust rod anchor designs were developed according to the invention which achieved the desired anchoring capabilities set forth earlier herein. The preferred embodiment of this design has been described generally above in connection with FIGS. 2 and 3 at 30, 32, and 58. Referring to FIGS. 6 and 7, top and side views of this preferred embodiment respectively are illustrated as employed with length or segment of pipe represented at 100. Revealed in general at 102, this preferred embodiment of a thrust rod anchor includes two identically structured spacers 104 and 105 formed of steel bar stock having a widthwise extent extending between the oppositely disposed edges thereof of about 2 inches. These widthwise edges are shown in FIG. 7 at 106 and 107 with respect to spacer 104. Each of the spacers 104-105 is positionable over a portion of pipe segment 100 representing half of its outer surface profile, this profile being substantially semi-circular in extent. The spacers additionally "flare out" and extend outwardly from the surface of pipe 100 in mutually spaced adjacency with one another to define connector portions within diametrically, opposite disposed thrust rod support regions 110 and 111. In this regard, reference is made to FIG. 8 where it may be observed that spacer 104 is formed having an integral extension 114 within region 111 and at 115 in region 110, while spacer 105 has an integral extension 116 within region 111 and at 117 within region 110. Each of the integral extensions 114-115 and 116-117 within respective thrust rod support regions 111 and 110 are structurally supported by flanges which are welded to each of the earlier-described widthwise edges of spacers 104 and 105. In this regard, it may be observed in FIGS. 6 and 7, that flanges 120 and 121 are welded to edge 106 of spacer 105, while flanges 122 and 123 are welded to widthwise edge 107 of spacer 105. Flange components 120-123 also are revealed in FIG. 9.

Figure 8:
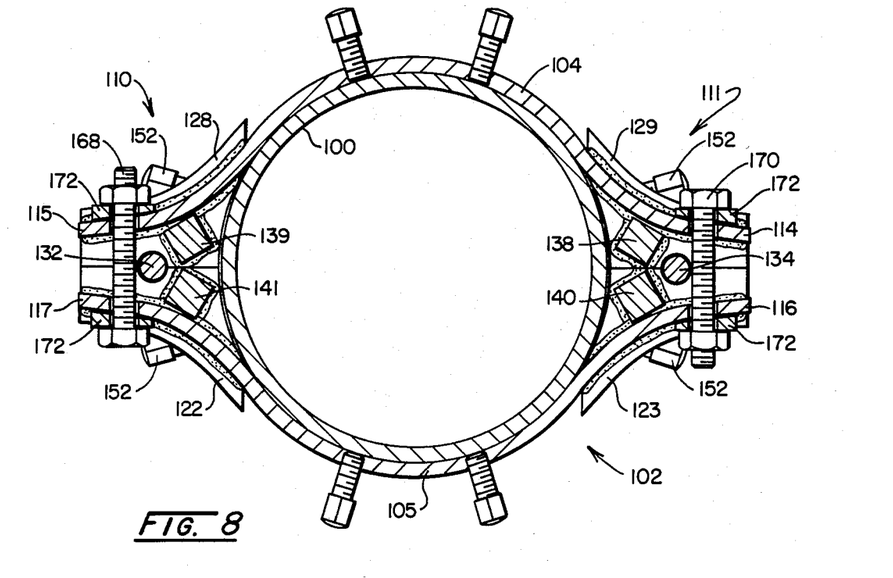
FIG. 8 is a sectional view of the thrust anchor arrangement of FIG. 7 taken through the plane 8—8 thereof.

In similar fashion, FIG. 6 reveals that a flange component 126 is fixed in structural supporting relationship to extension 115 of spacer 104 within region 110, while a corresponding flange 127 is fixed in structurally supporting relationship to extension 114 of spacer 104 within region 111. As represented in FIG. 8, a corresponding flange 128 is fixed in structurally supporting relationship (by welding) to extension 115 at the oppositely disposed widthwise edge, while a flange 129 is welded to extension 114 of spacer 104 within the region 111. FIGS. 6 and 8 further reveal that the flanges within each of the regions 110 and 111 extend inwardly toward positions of mutual abutting adjacency, each being configured having a half aperture which, at the noted adjacency forms an opening for receiving a thrust rod. One such aperture is shown defined by flanges 122 and 128 at 132, while a corresponding such aperture as defined by flanges 123 and 129 is shown at 134 within region 111.

Figure 9:
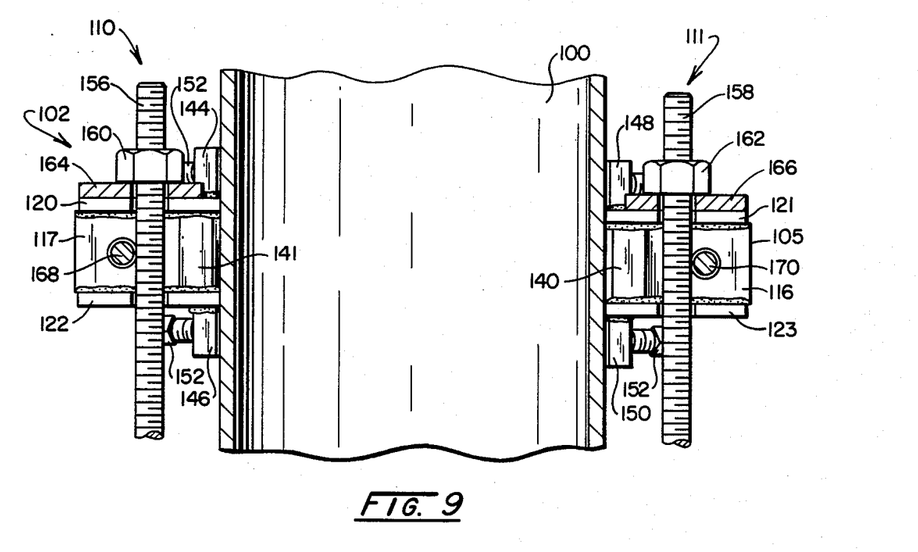
FIG. 9 is a sectional view of the anchor arrangement shown in FIG. 6, taken through the plane 9—9 shown therein.

Looking to FIGS. 8 and 9, each of the extensions 114-116 is formed having associated therewith a pipe engaging support arrangement including rigid structural supports present as steel bars of somewhat square cross section shown respectively in FIG. 8 at 138-141. Of course other supportive connections will occur to those skilled in the art. The lengthwise extent of bars 138-142 is revealed by the representation of bars 140 and 141 in FIG. 9. Note, that each of these steel bar supports is welded between associated flange components and is oriented so as to reside substantially in parallel with the axis of pipe 100. For example, as represented in FIG. 9, bar 140 is welded between flanges 121 and 123, while bar 141 is welded between flanges 120 and 122. In similar fashion, bar 138 is welded between flanges 127 and 129, while bar 139 is welded between flanges 126 and 128. Each of the bars 138-142 additionally is welded to the corresponding spacer with which they are associated. Note further that the bars 138-142 are operationally disposed at positions substantially adjacent the outer surface of pipe 100.

The pipe engaging support arrangement for each region 110 and 111 also includes block components serving to support a retainer arrangement provided as a plurality of set screws. In this regard, within thrust rod support region 110, outwardly extending block components 144 and 145 are welded to the outwardly disposed surfaces of respective flanges 120 and 126. These blocks 144 and 145 are symmetrically disposed with respect to an identical pair of blocks extending outwardly from opposite flanges 122 and 128. In this regard, FIGS. 7 and 9 reveal one of these block components at 146 extending from flange 122.

In similar fashion, outwardly extending block components 148 and 149 are shown welded respectively to the outwardly disposed surfaces of flanges 121 and 127 within thrust rod support region 111. As before, corresponding, symmetrically disposed blocks extend outwardly from the outwardly disposed surfaces of flanges 123 and 129. One of these blocks is revealed at 150 welded to and extending from the surface of flange 123.

It may be observed that the block components 144-150 are positioned so as to reside in adjacency with the outwardly disposed surface of pipe 100. Further, the blocks are canted such that tapped bores within each may carry retainers in the form of set screws 152 in an orientation radially disposed with respect to the axis of pipe 100. It may be observed that the block components 144-150 are positioned upon appropriate flange components in structurally mutually supportive relationship with the steel bars described at 138-142. Thus, the pipe 100 engaging arrangement includes a rigid support generally positioned adjacent the outwardly disposed surface of pipe 100. Outwardly disposed from this rigid structural support are the formed apertures as described in conjunction with FIG. 8 and 132 and 134 which receive oppositely disposed parallel thrust rods at 156 and 158. Rods 156 and 158 are retained in position by nuts shown respectively at 160 and 162 which bear, in turn, upon respective thrust plates 164 and 166. Thrust plates 164 and 166 serve to distribute thrust load from the thrust rod assemblies to the associated flange structures and the rigid structural supports of the pipe engaging assembly. The thrust rods 156 and 158 are positioned as close to this supporting structure and the pipe 100 itself as is practical to avoid the assertion of moment which otherwise would disrupt the anchoring function.

Spacers 104 and 105 are retained in mutual adjacency at thrust rod supportion regions 110 and 111 by respective bolted connections 168 and 170. Looking to FIG. 8, it may be observed that tapered washers 172 are used in conjunction with these bolted connections 168 and 170 to accommodate the slope of spacers 104 and 105 in the thrust rod regions 110 and 111. An important feature of the instant anchor assembly resides in the positioning of bolted connections 168 and 170 outwardly of respective thrust rods 156 and 158. With such an arrangement, thrust rods 156 and 158 can be positioned as close as possible to the rigid support structure of the anchors next to the surface of pipe 100. The bolted connections 168 and 170, may be so positioned outwardly of the thrust rods because the required "squeezing" action of conventional clamps is not present in the instant assembly. Spacers 104 and 105 serve to retain the oppositely disposed thrust rod support region assemblies at 110 and 111 in diametrically opposed position against the surface of pipe 100. Engagement with pipe 100 occurs by virtue of its connection with the anchor through set screws 152. Set screws 152 preferably are formed of a heat-treated alloy steel having a relatively high hardness, for example, a hardness of Rockwell C43 has been suggested. Generally, they are provided having a knurled, cup-shaped point making engagement with the outer surface of pipe 102 and may be observed to be symmetrically disposed about the corresponding axes of an associated thrust rod 156 or 158. To assure proper contact of the oppositely disposed thrust rod support region 110 and 111 with the external surface pipe 100, additional set screws as at 174 in spacer 104 and 176 in spacer 105 may be employed to adjust the assembly. It may be noted, however, that these set screws 174 and 176 do not perform the function of those at 152. It is the association of the latter set screws with the rigid pipe engaging support structural assembly which achieves requisite anchoring capabilities.

The preferred embodiment for thrust anchor 102 as represented in FIGS. 6–9 is one wherein a relatively smaller number of components are required to be assembled by the operator and this assembly is somewhat simple in nature. For example, essentially the entire anchor is comprised of the spacers 104 and 105 with their associated structural buttressing and flanges which are held together over pipe 100 by bolted connections 168 and 170. Thus, the operator need only provide such bolted connection, following which the set screws 152 are tightened under a desired torque, for example, 90 foot pounds. The thrust rods 156 and 158 may then be assembled onto the assembly in conjunction with respective thrust plates 164 and 166. Adjustment of the spacers 104 and 105 then may take place by appropriately manipulating set screws 174 and 176. In many instances of use of the anchor, the set screws 174 and 176 are not required.

Testing of the thrust rod anchor assembly 102 utilizing the test equipment described hereinabove has shown that the anchors 102 exhibit no slippage or deflection due to imposed moment at total thrust values of about 45,000 pounds. Slippage of tested models commenced at about 49,000 pounds, a value well above that considered necessary, ie. a value of 44,000 pounds. The above testing took place with assemblies fabricated for use in conjunction with 10 inch N.D. ductile iron pipe.

Figure 10:
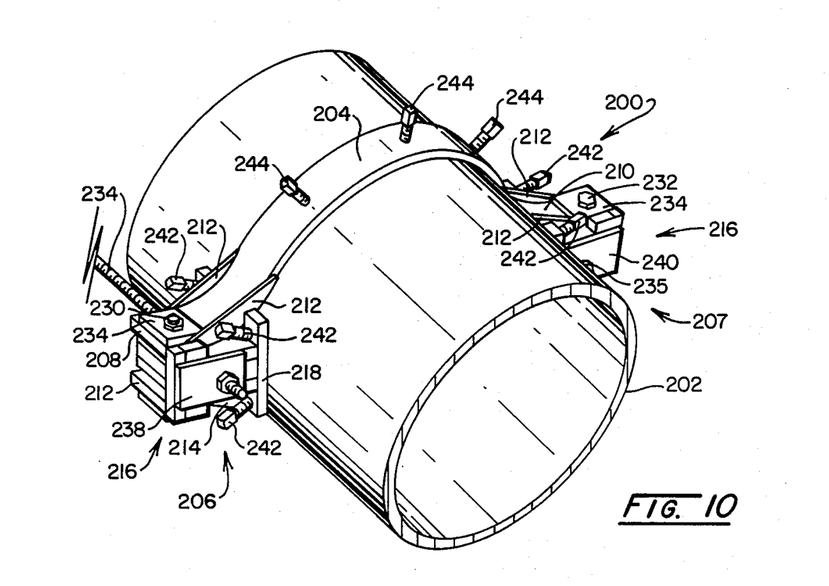
FIG. 10 is a perspective view of another embodiment of a thrust anchor according to the invention.
Figure 11:
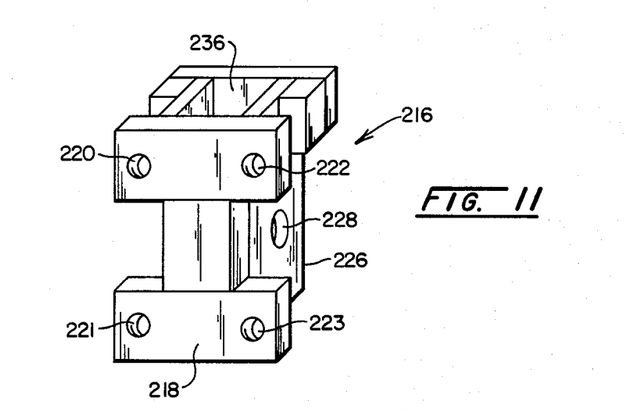
FIG. 11 is a perspective view of a pipe engaging support arrangement utilized in conjunction with the embodiment of the invention shown in FIG. 10.

Referring to FIGS. 10 and 11, another embodiment of the thrust rod anchor of the instant invention is revealed generally at 200, FIG. 10 showing the anchor mounted upon a segment of pipe 202. As in the earlier embodiment, anchor 200 includes identically structured spacers which wrap around pipe 202, the uppermost one of which is shown at 204. The spacers as at 204 are structured, as spacers 104 and 105 having a widthwise extent extending between oppositely disposed edges thereof amounting to about 2 inches. Further, each of these spacers as at 204 is positionable over a portion of pipe segment 202 representing half the outer surface profile thereof, this profile being substantially semi-circular in extent. The spacers "flare out" and extend outwardly from the surface of pipe 202 in mutually spaced adjacency with one another to define diametrically, oppositely disposed thrust rod support regions 206 and 207. As before, it may be observed that spacer 204 is formed having integral extensions 208 and 210 which cooperate with the corresponding integral extensions of the spacer positioned therebeneath, one such extension being revealed at 212. It may be observed, however, that the spacers as at 204 are formed having flanges as at 212 and 214 welded to the widthwise edges thereof but which are not fixed by welding or the like to a rigid structural support as represented by the steel bars 138–141 described in conjunction with FIGS. 8 and 9. It is important in the invention, however, that the spacers as at 204 be buttressed through the use of flanges or the like within the thrust rod support regions 206 and 207, a function carried out by flanges 212 and 214.

Referring additionally to FIG. 11, spacers as at 204 are seen to cooperate with two pipe engaging support arrangements revealed generally at 216. In particular, the arrangement 216 includes a rigid structural support 218 which is formed of structural steel in an "H" shaped configuration having four tapped bores 220–223 formed therein. Structural support 218 further is supported and buttressed by a channel-shaped connector assembly 226 having a bore 228 extending through both sides thereof. Bore 228 is dimensioned to receive connector bolt assemblies 230 and 232 which are revealed in FIG. 10. Returning to that figure, it may be noted that these connector bolt assemblies, utilizing tapered washers 234, extend through the oppositely disposed spacers in similar fashion as the embodiment of the invention revealed in FIGS. 6–9. The thrust rods utilized with anchor 200, one of which is revealed at 234, extend through the opening 236 defined by the opposite sides of channel-shaped connector 226. As before, thrust plates as at 238 are utilized in transferring load to the assemblage from the thrust rods. Additionally, as before, the pipe engaging components within regions 206 and 207 are retained in engagement with the outer surface of pipe 202 by high strength alloy steel set screws 242 extending through tapped bores 220–223. The latter bores are oriented such that the set screws 242 are aligned along a radius of pipe 202 and are symmetrically disposed about the axis of an associated thrust rod.

The anchor arrangement 200 enjoys the thrust resisting capabilities of the embodiment of FIGS. 6–9 through the advantageous positioning of the thrust rods as at 234 and 235 in close adjacency with the rigid structural support as associated with set screws 242. Because the spacers as a 204 do not serve the earlier-described "squeezing" function of earlier clamps, the connector bolt assemblies as at 230 and 232 again may be positioned outwardly of the thrust rods and the entire assembly avoids the substantial moment otherwise generated from the outwardly disposed thrust rods of the prior art.

As before, set screws 244 may be employed in conjunction with the spacers for the purpose of appropriately nesting rigid structure 218 in adjacency with the outer surface of pipe 202.

A test of the anchor embodiment of FIGS. 10 and 11 utilizing the testing arrangement described above was carried out. The anchor 200 was attached to a length of 10 inch N.D. ductile iron pipe with the tightening of set screws 242 to a torque of approximately 80–90 foot pounds. Total thrust applied to the test assemblage through thrust rods reached 50,000 pounds and a maximum deflection of about ⅛ inch at regions 206 and 207 was observed but no discernable degradation of the contacts of the set screws with the surface of the length of pipe was evidence. The test was terminated at 50,000 pounds.

An advantageous aspect of the thrust anchor design of the instant invention resides in the identical nature of the components thereof represented by the spacers and structure within the thrust rod support region or connector portions. Because of the substantial identity of these components, a plurality of them may be conjoined to develop a thrust anchor for relatively large diameter pipes. In consequence, the individual components readily are handled by the installer even though relatively larger pipe diameters and the use of more than two thrust rods may be involved in the installation. Looking to FIG. 12, the preferred embodiment of the invention as described in conjunction with FIGS. 6–9 is revealed, however, in the arrangement shown, a plurality, i.e. 4, thrust anchor components 250–253 are employed to develop an anchoring assemblage about large diameter pipe section 254. All of the elements of components 250–253 have been described in the earlier drawings. In this regard, note that each component 250-253 includes an arcuate spacer 256 of given widthwise extent and formed of bar stock. As before, these spacers 256 extend outwardly from the outer surface of pipe 254 to provide oppositely disposed connector portions within each thrust rod support regions as at 258-261. Additionally, a pair of flanges are welded to each of these edges at the connector portions, one outwardly disposed surface of the flange pair being revealed in the figure. For example, the paired flanges for component 250 are revealed generally at 264, while the corresponding flange pairs for anchor components 251-253 respectively are shown at 265-267. Connection between components 250-253 is provided in the same manner as described in connection with the two component embodiment, that is by bolt and nut connectors shown respectively at 270-273. A rigid support is welded between each of the flanged pairs 264-267 in the same fashion as those supports described in conjunction with FIG. 8 and 138-141 and a support arrangement including four blocks, two of which are revealed extending upwardly from flanges 264-267 respectively at 276-279 are provided. Blocks 276-279 are formed having tapped bores which support high strength alloy steel set screws 280, the tips of which engage the outer surface of pipe 254. As before, set screws 280 are aligned along a radius of the pipe 254.

Figure 12:
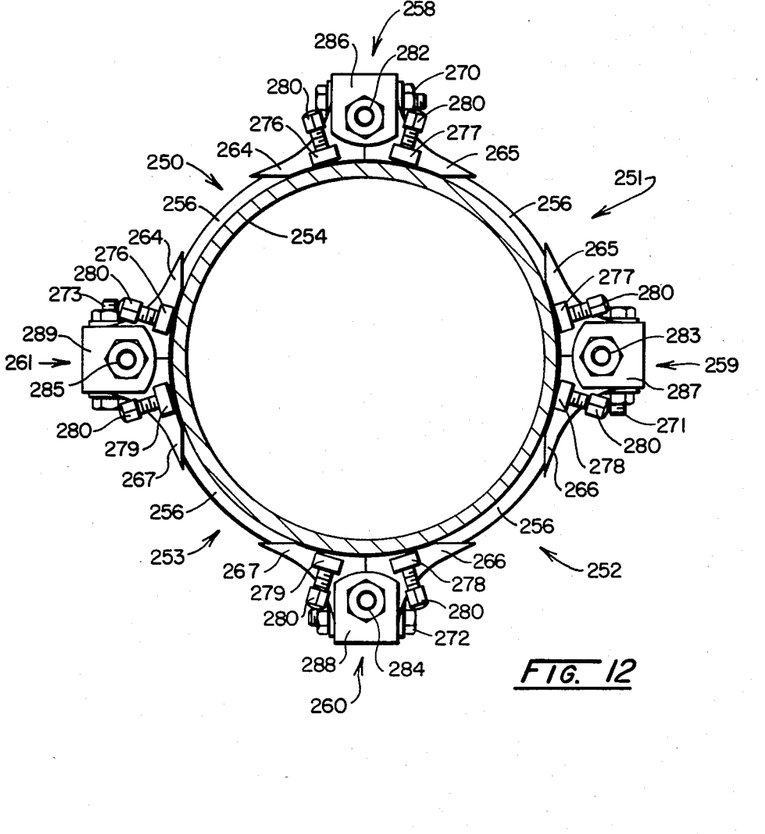
FIG. 12 is end view of a combined plurality of thrust anchor components as may be utilized with pipes of longer diameter.

Four thrust rods 282-285 are shown anchored by the assemblage of components 250-253, these thrust rods being in stress transferring abuttable contact with respective thrust plates 286-289. Where desired, the thrust plates may be tack welded to alternate ones of the components 250-253. Such an arrangement facilitates installation procedures.

Since certain changes may be made in the above-described apparatus and system without departing from the scope of the invention herein involved, it is intended that all matter contained in the description thereof or shown in the accompanying drawings shall be interpreted as illustrative and not in a limiting sense.

I claim:

1. For use in a pipe joint restrainer system wherein elongate thrust rods are connected by threaded coupling with nuts in tension between one side of a joint and a portion of remotely disposed pipe having a given axis, the improved thrust rod anchor comprising:

first and second spacer means of given width defined parallel with said axis between their spaced, oppositely disposed edges, each being positionable over a portion of the outer surface profile of said pipe and extensible outwardly from said surface in mutually spaced adjacency with the other to define first and second spaced thrust rod support regions extending outwardly from the surface of said pipe;

flange means weldably fixed in structural supporting relationship with said spaced, oppositely disposed edges of said first and second spacer means within said first and second thrust rod support regions;

first and second connector means for connecting together said first and second spacer means within said respective first and second thrust rod support regions, each said first and second connector means being spaced outwardly from the position of the surface of said pipe adjacent thereto;

first and second pipe engaging support means each including rigid structural support means operationally positioned adjacent said pipe surface respectively within said first and second thrust rod support regions, said structural support means being substantially parallel with said pipe axis and located inwardly from respective said first and second connector means, said first and second pipe engaging support means being in supporting relationship with said flange means;

first and second thrust plate means in stress transfer relationship respective with said first and second pipe engaging support means each having an opening located intermediate respective said first and second connector means and said pipe for receiving one end of a said thrust rod through said opening and providing abutting engagement with a said nut threadably coupled with said thrust rod one end; and retainer means engageable with said first and second pipe engaging support means for penetrably engaging the surface of said pipe and restraining said first and second pipe engaging support means for movement along said pipe axis.

2. The improved thrust rod anchor of claim 1 in which:

said retainer means comprises set screw means; and said first and second pipe engaging support means are configured for threadably retaining said set screw means in substantially radial alignment with respect to said pipe axis.

3. The improved thrust rod anchor of claim 1 in which:

said retainer means comprises set screw means; and said first and second pipe engaging support means is configured for retaining said set screw means in symmetrical disposition about said openings within said first and second thrust plate means.

4. The improved thrust rod anchor of claim 1 in which each said first and second pipe engaging support means rigid structural support means comprises a support component fixed in structural supporting relationship to each said first and second spacer means and extending in supporting relationship between said flange means at said opposite parallel edges.

5. The improved thrust rod anchor of claim 4 in which said first and second thrust plate means each are configured as a metal plate having an opening theren for receiving a said thrust rod and positionable in abutting relationship with outwardly disposed surfaces of said flange means fixed to said first and second spacer means.

6. The improved thrust rod anchor of claim 1 in which:

said first and second pipe engaging support means rigid structural support means includes a support component fixed in structural supporting relationship to each said first and second spacer means and extending in supporting relationship between said flange means at said opposite parallel edges; and each said first and second pipe engaging support means includes a block component fixed to and extending outwardly from each said flange means and configured for supporting said retainer means.

7. The improved thrust rod anchor of claim 6 in which:

said retainer means comprises set screws; and each said first and second pipe engaging support means block component is configured to threadably engage and retain a said set screw.

8. The improved thrust rod anchor of claim 7 in which each said first and second pipe engaging support means block component is configured to retain a said set screw in substantially radial alignment with respect to said pipe axis.

9. The improved thrust rod anchor of claim 8 in which each said first and second pipe engaging support means includes at least four said block components.

10. The improved thrust rod anchor of claim 8 in which each said first and second connector means comprise a bolt and nut connection, said bolt and nut being positioned outwardly of a said thrust rod when operationally positioned within a said thrust rod support region.

11. The improved thrust rod anchor of claim 8 including auxiliary set screw means threadably engaged within a said first and second arcuate spacer means and rotatably driveable into engagement with said surface of said pipe for accommodating stretch characteristics of said first and second arcuate spacer means.

12. The improved thrust rod anchor of claim 1 in which:
said first and second pipe engaging support means each includes an elongate channel structure having spaced side members defining an elongate passage therebetween, said passage having a width parallel with said axis sufficient for receiving a said thrust rod, having openings formed therein for receiving a respective said first and second connector means, and including abutting means fixed to and extending outwardly from said side members for abuttable engagement with said flange means; and
said rigid structural support means comprises a plate assembly fixed to said channel structure and configured for retaining said retainer means.

13. The improved thrust rod anchor of claim 12 in which:
said retainer means comprises set screws; and
said rigid structural support means plate assembly is configured for threadably retaining said set screws in substantially radial alignment with respect to said pipe axis.

14. The improved thrust rod anchor of claim 13 in which said rigid structural support means plate assembly is configured for retaining said set screws in symmetrical disposition about said channel structure elongate passage.

15. A thrust rod anchor for connection to a pipe comprising:
first and second spacers, each having an arcuate portion mountable over a cylindrical portion of said pipe and each having oppositely disposed connector portions extending outwardly from said arcuate portion;
a pair of spaced parallel flanges fixed to each said first and second spacer connector portions, corresponding said pairs of flanges being in abuttable adjacency and having an opening configured to receive a thrust rod when said first and second spacers are operationally positioned about a said pipe;
rigid support means fixed to and extending between each said pair of flanges adjacent said arcuate portion;
a bolt and nut connector extensible through said first and second spacer connector portions outwardly of said flange openings for retaining said first and second spacers in an operational said position about a said pipe; and
support means fixed to the outwardly disposed surface of each said flange and having a threadably tapped bore for receiving a set screw.

16. The thrust rod anchor of claim 15 including a pair of thrust plates positionable over said flange opening when in said abuttable adjacency for transferring stress from said thrust rod to said flanges and rigid support means.

17. The thrust rod anchor of claim 15 in which each said support means bore is substantially radially aligned with respect to the curvature of said first and second spacers.

18. In a pipe joint restrainer system wherein thrust rods are connected in tension along pipe having a given axis and arcuate outer surface, the improved thrust rod anchor component for use with other such components to provide a thrust rod anchor, comprising:
spacer means of given width defined parallel with said axis between spaced, oppositely disposed edges thereof, having an arcuate portion positionable over a predetermined extent of said outer surface, said spacer means further having oppositely disposed connector portions, each extending outwardly from said arcuate portions and having an opening therein for receiving a connector;
a pair of flanges weldably fixed in structural supporting relationship with said spaced oppositely disposed edges of said spacer means at said oppositely disposed connector portions and having an edge configuration formed inwardly of said opening for receiving a portion of a said thrust rod;
rigid support means fixed to and extending between oppositely disposed said flange means; and
support means fixed to the outwardly disposed surface of a said flange and having a threadably tapped bore for receiving a set screw.

19. The thrust rod anchor component of claim 18 in which said support means bore is substantially radially aligned with respect to the curvature of said first and second spacers.

20. The thrust rod anchor component of claim 19 including at least one thrust plate positionable over a said flange edge configuration for transferring stress from a said thrust rod to said flanges and rigid support means.

* * * * *